(12) United States Patent
Ichimi et al.

(10) Patent No.: US 6,356,985 B1
(45) Date of Patent: Mar. 12, 2002

(54) COMPUTER IN MULTI-CLUSTER SYSTEM

(75) Inventors: Masahiro Ichimi; Takashi Yamada, both of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/179,871

(22) Filed: Oct. 28, 1998

(30) Foreign Application Priority Data

Oct. 30, 1997 (JP) .............................................. 9-298034
Oct. 23, 1998 (JP) ............................................ 10-302051

(51) Int. Cl.[7] .............................................. G06F 13/16
(52) U.S. Cl. ...................................................... 711/154
(58) Field of Search ................................ 711/112, 114, 711/154, 170

(56) References Cited

U.S. PATENT DOCUMENTS 5,903,913 A  *  5/1999  Ofer et al. .................. 711/156

FOREIGN PATENT DOCUMENTS

JP          8-227395         9/1996
JP          8-305623         11/1996

* cited by examiner

Primary Examiner—Kevin L. Ellis
(74) Attorney, Agent, or Firm—Staas & Halsey LLP

(57) ABSTRACT

A computer in a system includes a storage area request unit for notifying a storage device of the request size of a storage area in the storage device and the identification information of the apparatus; a storage device access unit for accessing an area assigned to the apparatus in the storage device using the identification information of the apparatus and specified by the identification information of the area; and a storage area assignment unit for notifying the apparatus of the identification information of an area to be assigned by the storage device to the apparatus according to the notification from the storage area request unit. With the above described configuration of the system in which a plurality of apparatuses share a storage device, a process can be easily inherited using the storage device when an optional apparatus in the system becomes inoperable.

20 Claims, 10 Drawing Sheets

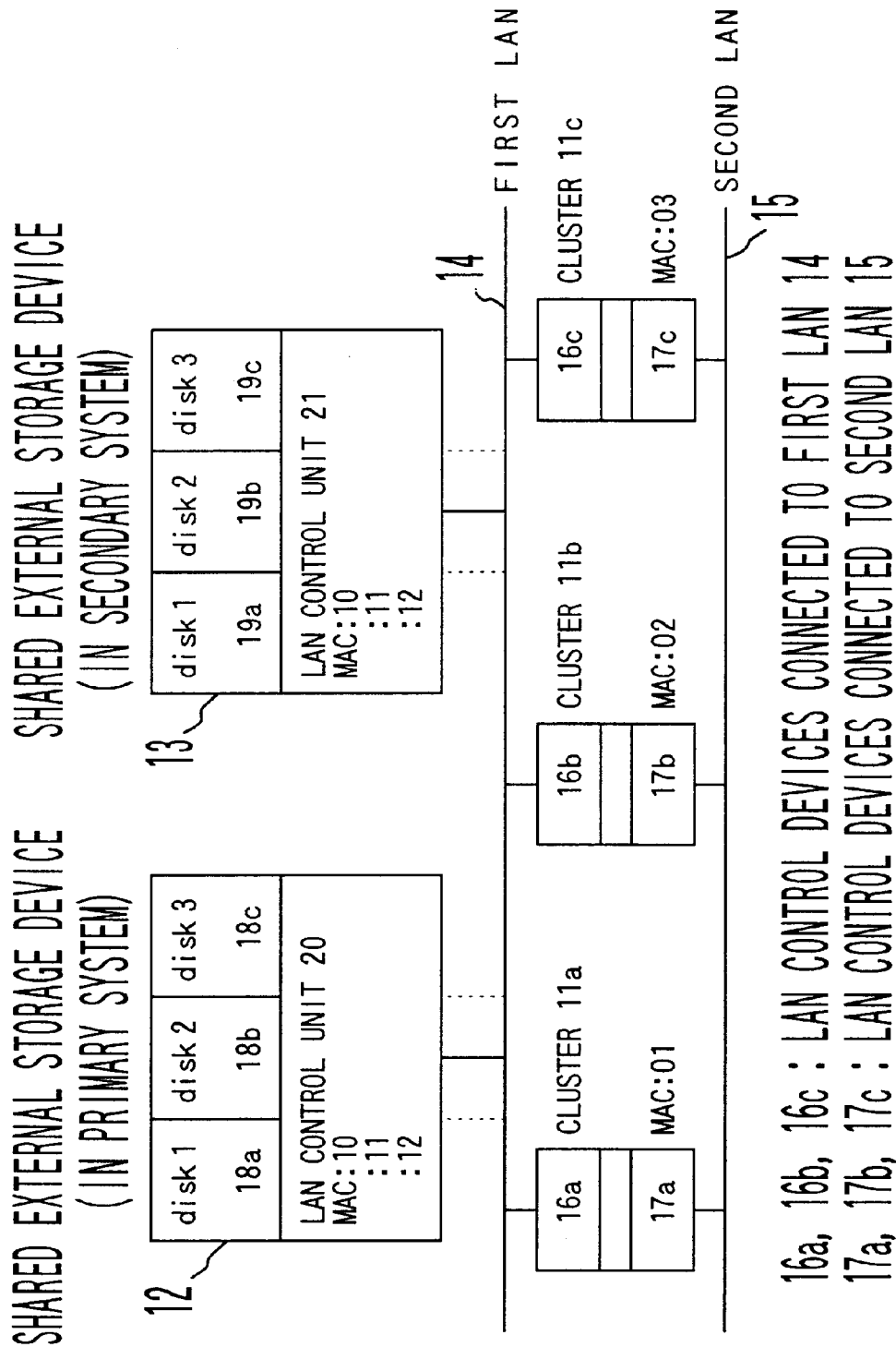
F I G. 2

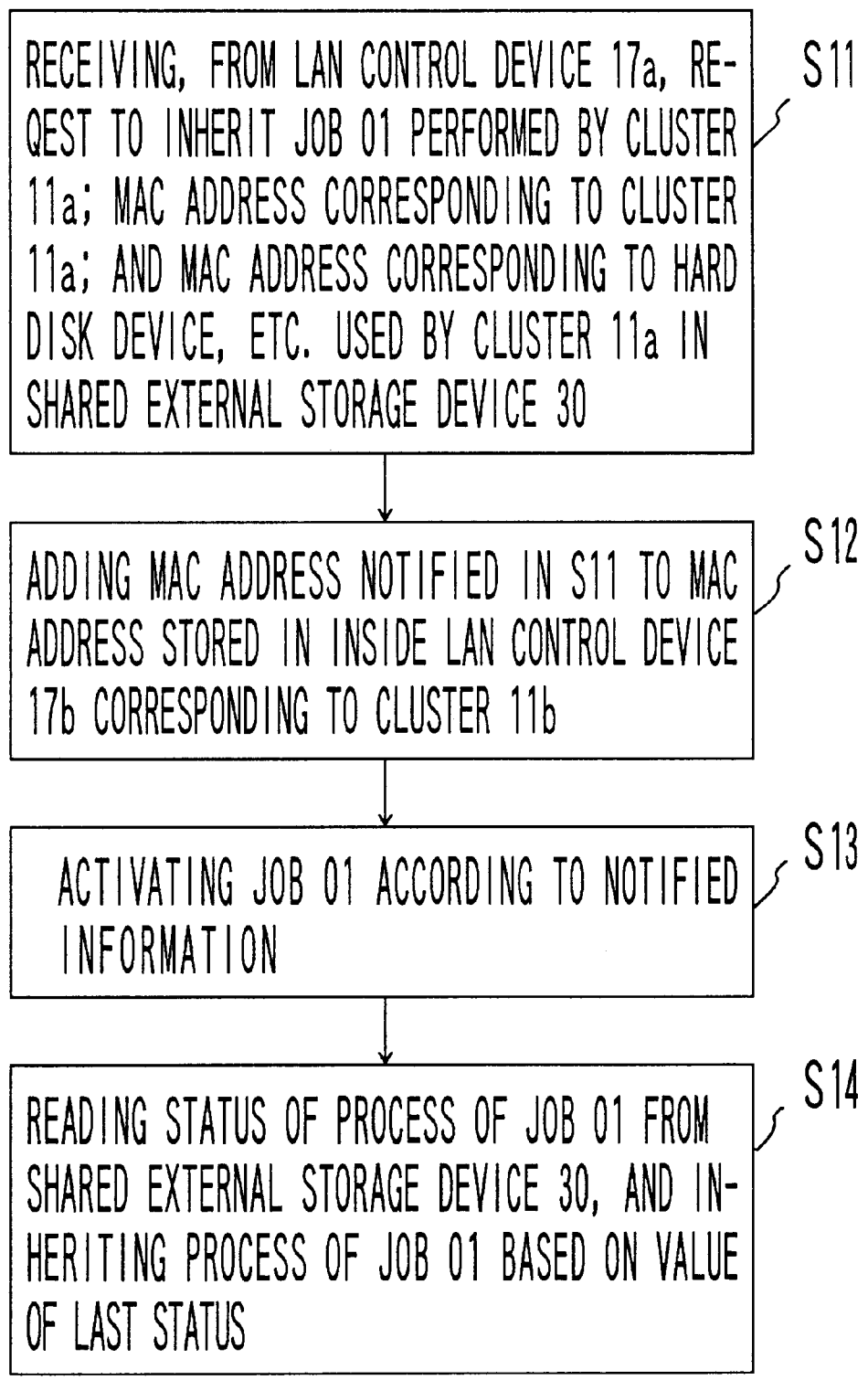
F I G. 7

COMPUTER IN MULTI-CLUSTER SYSTEM

BACKGROUND OF THE INVENTION

1. Field of the Invention

The present invention relates to a multi-cluster system including a plurality of computers, that is, clusters, and more specifically to a multi-cluster system capable of continuing operations, when one or more clusters forming part of a system become inoperable for any reason, by another cluster in the system replacing the inoperable cluster(s).

2. Description of the Related Art

A multi-cluster system includes a plurality of computers, that is, clusters, to process a database, etc. using, for example, a commonly available disk device.

On the other hand, there is a computer system for realizing a 24-hour operation by completely preventing the system from stopping using duplexed or triplexed CPUs (central processing unit) or input/output devices. For example, this computer system can be a fault-tolerant system. When some clusters in the multi-cluster system according to the present invention become inoperable for any reason, the processes being performed by those clusters are performed by other clusters in the system. Therefore, the process being performed by the clusters may be stopped only for a short time, but the total computer system can be continuously operated.

If a cluster becomes faulty when a process is being performed by such a multi-cluster system using a commonly available external storage device, it is necessary to pass detailed information containing an address in the external storage device being used by the faulty cluster in order to pass the process being performed by the faulty cluster to another cluster. This has been a problem in that the process being performed by a faulty cluster is necessarily inherited in complicated steps.

When a commonly available external storage device is formed by, for example, a plurality of hard disk devices, detailed information specifically indicating the hard disk device, partition, portion, etc. including the exact data storage position should be passed on for the process being performed by the faulty cluster to be inherited.

SUMMARY OF THE INVENTION

The present invention aims at enabling the inheriting of a process being executed by a faulty cluster when another cluster inherits the process being executed by the faulty cluster, by receiving a notification of a MAC (Media Access Control) address indicating the data storage area if a plurality of computers forming a multi-cluster system allows an identification symbol in the network, for example, the MAC address in a local area network, to correspond one to one to each cluster and each data storage area in an external storage device.

To solve the above described problems, the present invention includes, in an apparatus having a storage device, a storage area request unit for notifying the storage device side of the requested size of a storage area in the storage device and the identification information of the apparatus, for example, the MAC address, and a storage device access unit for accessing an area assigned to the apparatus in the storage device and specified by the identification information of the area.

In another aspect of the present invention, the apparatus is used as a computer which forms a part of a multi-cluster system having a plurality of such apparatuses.

The apparatus which forms a part of the system notifies the storage device side of the request size of a storage area in the storage device and the identification information of the apparatus. The apparatus accesses the area assigned to the apparatus in the storage device using the identification information of the apparatus. When an optional apparatus in a plurality of apparatuses becomes inoperable, the storage device access unit of another apparatus which inherits the process being performed by the inoperable apparatus accesses the area according to the identification symbol of an area assigned to the inoperable apparatus using the identification symbol of the inoperable apparatus. Then, the process can be easily inherited by reading the final status of the job, etc. stored in the area assigned to the inoperable apparatus.

BRIEF DESCRIPTION OF THE DRAWINGS

FIG. 2 is a block diagram showing the configuration of the multi-cluster system as an embodiment of the present invention;

FIG. 7 is a flowchart showing the process of inheriting JOB 01 performed by the LAN control device 17b belonging to the cluster 11b which inherits JOB 01 when there is a faulty cluster in the clusters shown in FIG. 5;

DESCRIPTION OF THE PREFERRED EMBODIMENT

Figure 1:
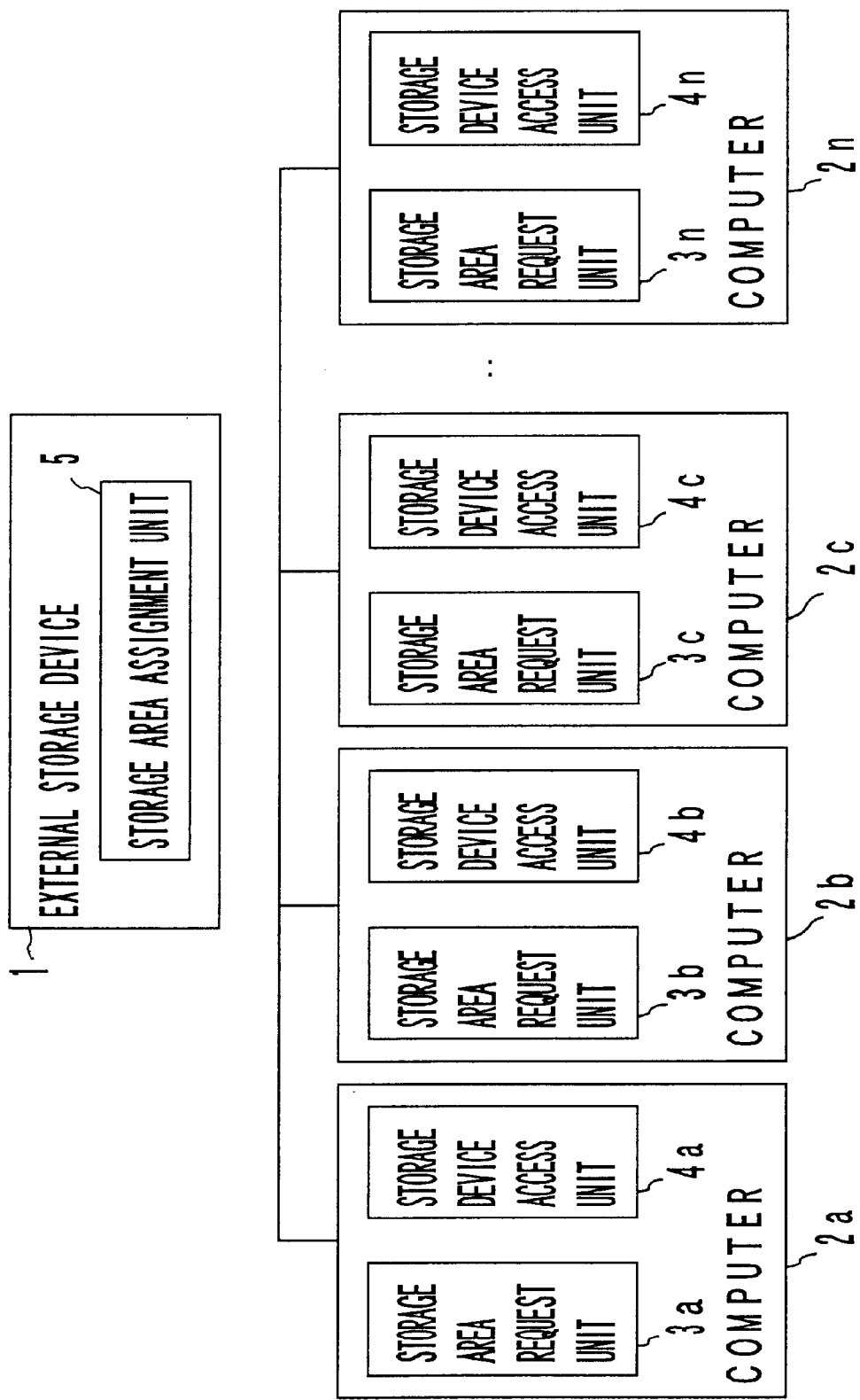
FIG. 1 is a block diagram showing the configuration according to the principle of the present invention.

FIG. 1 is a block diagram showing the configuration according to the principle of the present invention. In FIG. 1, the multi-cluster system comprises a plurality of computers 2a, 2b, 2c, . . . , and 2n connected to the sharable external storage device 1.

The above described system is not limited to a multi-cluster system. This system can comprise the external storage device 1 and the computer 2a. Furthermore, the storage device can be an external storage device or an internal storage device.

In FIG. 1, a storage area request unit provided in each computer, for example, 3a, notifies an external storage device 1 of the request amount of a storage area in an external storage device 1, and of the identification symbol of the computer 2a which the storage area request unit 3a is provided.

A storage device access unit 4a accesses an area in the storage device which is assigned to the computer 2a and which can be specified by the identification symbol of the area. The storage area request unit and the storage device access unit are provided in each of the computers 2a, 2b, 2c, ..., and 2n forming the multi-cluster system.

In FIG. 1, a storage area assignment unit 5 provided in the external storage device 1 notifies a storage area request unit in each computer, for example, 3a, of the area identification symbol for an area assigned to a computer according to the request size of a storage area and the notification of the identification symbol of the computer received from the storage area request unit 3a. Thus, the storage device access unit 4a in the computer 2a accesses the area specified by the received area identification symbol.

Thus, using an identification symbol, for example, a MAC address, of each computer, a plurality of computers forming a multi-cluster system according to an embodiment of the present invention access an area assigned to each computer in the external storage device 1, that is, an area specified by the identification symbol, for example, a MAC address. When an optional computer in a plurality of computers becomes inoperable, the storage device access unit of another computer accesses an area to inherit the process being performed by the inoperable computer according to the identification symbol of an area assigned to the inoperable computer using the identification symbol of the inoperable computer. Then, the process can be easily inherited by reading the final status of the job, etc. stored in the area assigned to the inoperable computer.

According to another embodiment of the present invention, the multi-cluster system can be designed to have the smallest possible number of computers, for example, only one computer which comprises a storage device access unit. That is, the storage device access unit accesses an area in an external storage device assigned to each computer specified by the area identification symbol corresponding one to one to each computer. Another computer in the plurality of computers comprises a storage device access request unit for requesting the storage device access unit to access an area assigned to the computer using the identification symbol of the computer, for example, a MAC address.

As a further embodiment of the present invention, the external storage device 1 shown in FIG. 1 can be designed as a duplexed device containing a primary system and a secondary system. According to the embodiment, an operation control unit is provided in an external storage device in the secondary system. This operation control unit controls the operations of the primary and secondary system such that a reading operation is performed on the storage device of the secondary external storage device as well as on the primary external storage device in response to a write access from the above described storage device access unit, and, when communications are not made for a predetermined time between an external storage device in the primary system and a computer forming part of the multi-cluster system, a switch signal is transmitted to the external storage device in the primary system so that the external storage device in the secondary system can start functioning as an external storage device in the primary secondary system.

Thus, the external storage devices in the primary and secondary systems are designed for mirroring, thereby easily switching control from one to the other in case of a failure of an external storage device.

All embodiments of the present invention can be applied not only to the multi-cluster system but also to the Internet. When the present invention is applied through the Internet, each computer uses a telephone number, etc. as identification information when access is to be gained to a specified area in a specified storage unit.

An example of applying the present invention through the Internet is described below.

If a session is interrupted for any reason while an optional computer connected to the Internet is communicating with another computer, a storage device access unit of the other computer connected to the Internet accesses a storage device or a storage area inside or outside the computer whose session has been interrupted using the identification information, for example, a source number, of the computer whose session has been interrupted. Then, the other computer connected to the Internet obtains the necessary information to resume the session from the above described storage device or the storage area. The other computer connected to the Internet can resume the session according to the obtained information.

The embodiment of the present invention is described below in detail by referring to the attached drawings. In the following descriptions, a cluster is connected through a LAN. However, a network through which clusters are connected is not limited to a LAN. The present invention is applicable even when a computer is connected through other networks such as a WAN (wide area network), etc. Furthermore, as described above, the present invention can be applied not only to the multi-cluster system but also to the Internet.

FIG. 2 is a block diagram showing the configuration of a multi-cluster system according to an embodiment of the present invention. In FIG. 2, the multi-cluster system comprises three clusters 11a through 11c, a shared external storage device 12 in the primary system, a shared external storage device 13 in the secondary system, a first LAN (Local Area Network) 14 for connecting the two external storage devices to the three clusters, and a second LAN 15 for connecting the three clusters to each other.

Each of the clusters 11a through 11c comprises a LAN control device, for example, 16a, for controlling the connection to the first LAN 14, and a LAN control device, for example, 17a, for controlling the connection to the second LAN 15.

The shared external storage device 12 in the primary system comprises, for example, three hard disk devices 18a through 18c, and a LAN control unit 20. The shared external storage device 13 in the secondary system comprises, for example, three hard disk devices 19a through 19c, and a LAN control unit 21.

In FIG. 2, the shared external storage device 12 in the primary system is used in a normal operation. During the normal operation, the shared external storage device 13 in the secondary system stores the same data as the shared external storage device 12 in the primary system. Thus, the two shared external storage devices are designed for mirroring.

When the shared external storage device 12 in the primary system becomes faulty and the communications between the shared external storage device 12 and each cluster stop, the stop state is detected by the shared external storage device 13 in the secondary system. Then, the shared external storage device 13 in the secondary system issues a switch instruction to the shared external storage device 12 in the primary system in order to function as a shared external storage device in the primary system.

In FIG. 2, the first LAN 14 is connected to the two shared external storage devices 12 and 13 through respective ports as indicated by in solid lines. However, for example, it can also be connected to the three hard disk devices, for example, to the three ports corresponding to the hard disk devices 18a through 18c.

In FIG. 2, the two LANs 14 and 15 are used to separately provide the path for access to the external storage devices and the path for communications between clusters. It is also possible to connect the paths using only one LAN.

According to the present invention, each cluster and the area in the external storage device (for example, a hard disk device or a partition) assigned to each cluster correspond to respective MAC addresses as unique identification symbols in the hardware in each LAN.

In FIG. 2, the MAC addresses 01 (actually, 6 bytes of xx xx xx xx xx01 are abbreviated into 01), 02, and 03 are assigned to the clusters 11a, 11b, and 11c respectively on the cluster side. For the shared external storage devices 12 and 13, the MAC addresses 10, 11, and 12 are assigned to the hard disk devices 18a, 18b, and 18c respectively.

Figure 3:
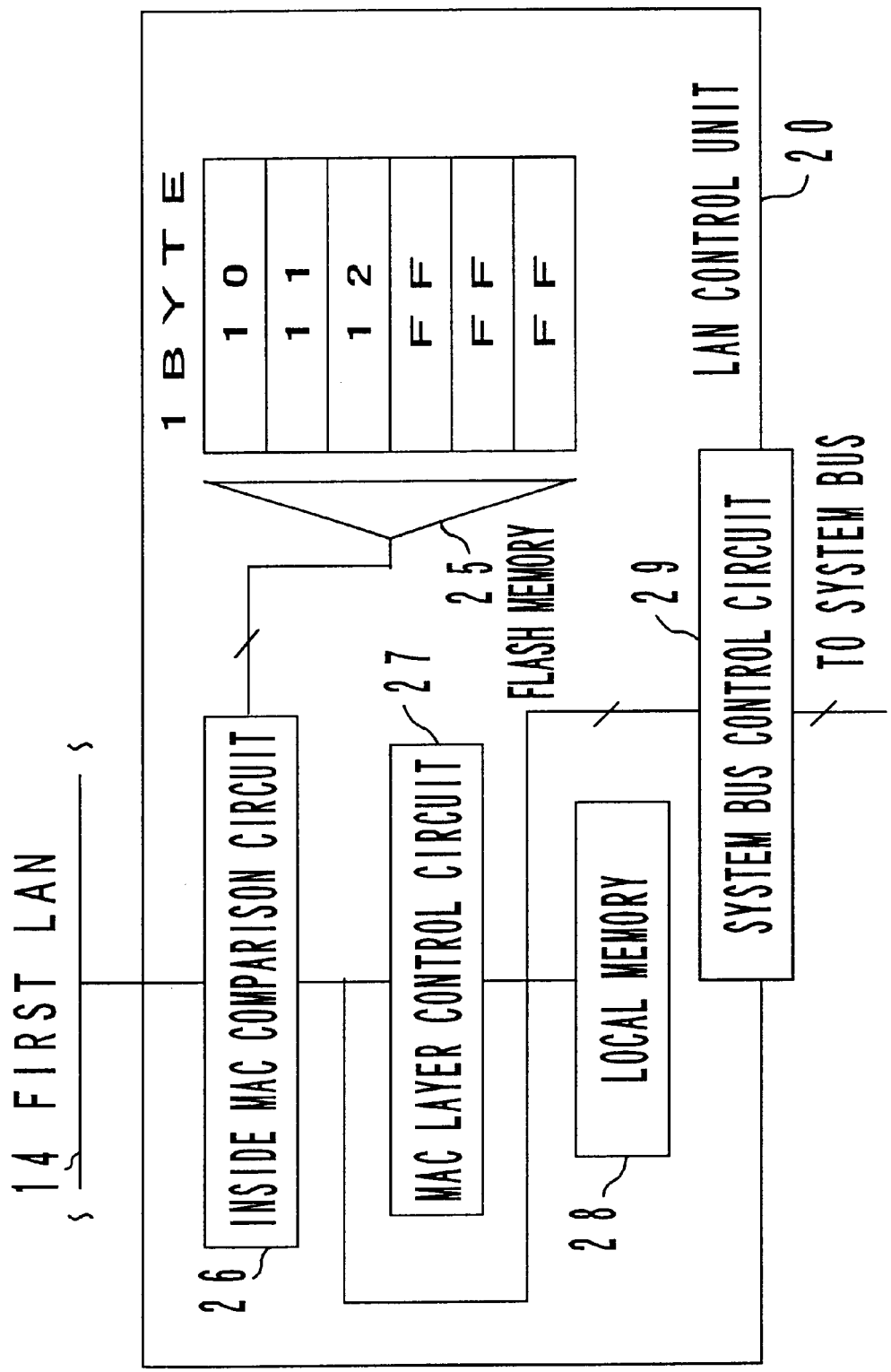
FIG. 3 is a block diagram showing the detailed configuration of the LAN control unit in the shared external storage device shown in FIG. 2.

FIG. 3 is a block diagram showing the detailed configuration of the LAN control unit in the shared external storage device 12 or 13 shown in FIG. 2. Described below is the configuration of the LAN control unit 20 of the shared external storage device 12 in the primary system.

The LAN control unit 20 comprises a flash memory 25 of 1 byte capacity for storing MAC addresses corresponding to the three hard disk devices 18a through 18c in the shared external storage device 12 in the primary system, a MAC comparison circuit 26 for detecting a destination MAC address of a frame existing in the first LAN 14, for checking whether or not it matches the address stored in the flash memory 25, and passing the frame to the MAC layer control circuit 27 if they match each other, a MAC layer control circuit 27, a local memory 28 for storing data necessary for control, and a system bus control circuit 29 for controlling the transmission of data on a system bus connected to the three hard disk devices 18a through 18c.

Only one lower byte of the MAC address is written to the flash memory 25, and the MAC comparison circuit 26 accesses the flash memory 25 using the lowest byte of the six bytes forming the MAC address. This writing operation is performed based on, for example, the environment definition set in the shared external storage device when the system is initialized. When there are, for example, three MAC addresses corresponding to the respective hard disk devices 18a through 18c in the shared external storage device or the further divided areas, the three areas of the six storage areas in the flash memory 25 store FF. That is, according to the present invention, no MAC addresses whose the lowest byte are FF are used.

Figure 4:
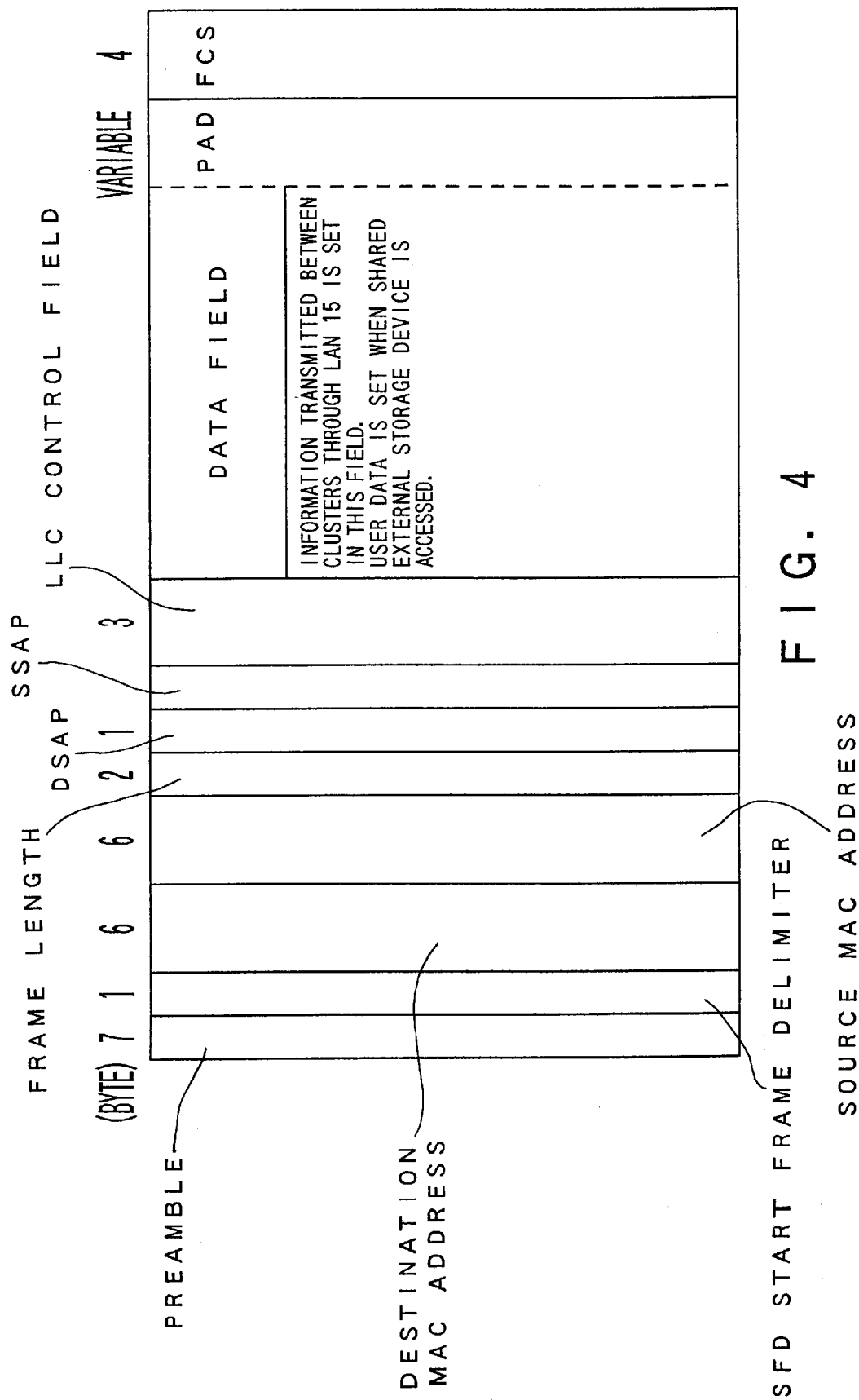
FIG. 4 shows an example of the format of the LAN frame in the multi-cluster system shown in FIG. 2.

FIG. 4 shows an example of a LAN frame format used in the LANs 14 and 15 shown in FIG. 2 as an embodiment of the present invention. FIG. 4 shows a format of the frame in an Ethernet as an example of a frame. In FIG. 4, the shared external storage device is accessed using the 6-byte destination MAC address and the 6-byte source MAC address stored after the preamble and the start frame delimiter. User data is set in the data field of the frame when the shared external storage device is accessed. When a cluster becomes faulty, as described later, the data transmitted between clusters through the LAN 15 is set.

Described below by referring to FIG. 2 is the case in which each of the clusters 11a through 11c independently accesses the shared external storage device 12. It is assumed that the clusters 11a through 11c respectively use the hard disk devices 18a through 18c. The disk devices are assigned by the shared external storage device 12 in response to the notification from each cluster about the MAC address of each cluster and the size of required disk space. The external storage device 12 notifies each cluster of each MAC address corresponding to the assigned hard disk device. At this time, for example, the cluster 11a sets a MAC address 10 for the hard disk device 18a as the destination MAC address shown in FIG. 4, sets the MAC address 01 as a source MAC address, and accesses the shared external storage device 12 in the primary system through the first LAN 14.

It is recognized in the shared external storage device 12 that the hard disk device 18a is being accessed according to the predetermined settings of the environment or the result of the negotiation through the LAN. The MAC address 01 of the destination cluster 11a is also recognized. Hereafter, the cluster 11a continues accessing the shared external storage device 12 as the hard disk device of the MAC address 10 without considering the hard disk device 18a to be actually accessed. These operations are similarly performed on the clusters 11b and 11c.

Described below is the case in which the shared external storage device 12 is actually accessed through only one cluster. The cluster which accesses the shared external storage device 12 in the primary system can be for example, the cluster 11a, and the clusters 11b and 11c request the cluster 11a through the second LAN 15 to access the shared external storage device 12 in the primary system.

The cluster 11a transmits to the shared external storage device 12 in the primary system a frame notifying the capacity of a disk used in each of the clusters 11a through 11c using a MAC address of each cluster set as an initialization process by, for example, the above described definition of the environment from the shared external storage device 12 in the primary system corresponding to the frame transmitted to each of the clusters 11a through 11c. Then, the shared external storage device 12 assigns any of the three hard disk devices 18a through 18c or a partition divided in one disk device according to the request of the capacity of a disk from each cluster.

Then, the clusters 11b and 11c access a disk through the cluster 11a. At this time, disk access requests are issued from the clusters 116 and 11c to the cluster 11a by setting the MAC address corresponding to the hard disk or the partition obtained by dividing one hard disk device assigned to the clusters 116 and 11c as a destination MAC address as shown in FIG. 4, and by setting the MAC address, for example, 02 for the cluster 11b, assigned to the cluster 116 as a source MAC address. When data is to be transmit ted in response to the access, the shared external storage device 12 transmits the data directly to the cluster 11b through the first LAN 14 using the MAC address of the destination cluster, for example, the MAC address 02, for the cluster 11b.

Assume that the cluster 11a becomes faulty and its process cannot be performed when the three clusters 11a through 11c shown in FIG. 2 are performing respective processes, for example, processing databases. In this case, the process being performed by the cluster 11a is inherited by the cluster, for example, 11b, based on the predetermined environment settings. At this time, the cluster 11a notifies the cluster 11*b* through the LAN 15 of the MAC address, for example, 10, for the disk device or a partition used by the cluster 11*a* in the shared external storage device 12 in the primary system, and the process is stopped. The cluster 11*b* performs the job inherited from the cluster 11*a* in addition to the job which has been performed by the cluster 11*b*, and separately uses the MAC addresses, for example, 10 and 11, when the shared external storage device 12 is accessed.

Figure 5:
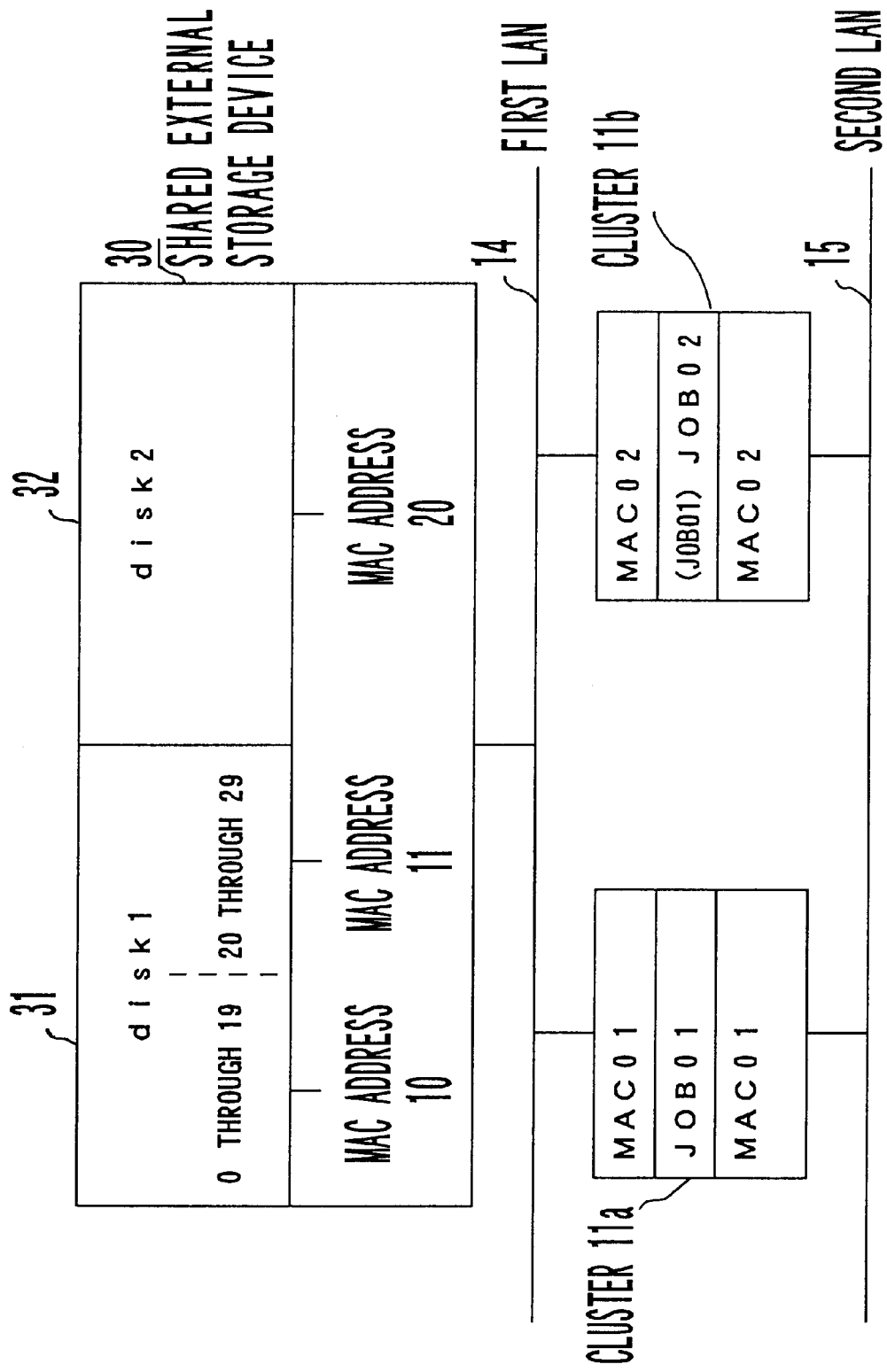
FIG. 5 shows how the process being performed by a faulty cluster is inherited.

FIG. 5 shows the inheritance of a process when a cluster becomes faulty. In FIG. 5, only a shared external storage device 30 in the primary system is shown as a shared external storage device. This device comprises hard disk devices 31 and 32. The hard disk device 31 is further divided into two parts consist of partitions 1 through 19 and partitions 20 through 29 respectively. The MAC address 10 is assigned to the partitions 1 through 19 of the disk device 31. The MAC address 11 is assigned to the partitions 20 through 29. The MAC address 20 is assigned to the hard disk device 32. As for clusters, there are two clusters 11*a* and 11*b* shown in FIG. 5.

Figure 6:
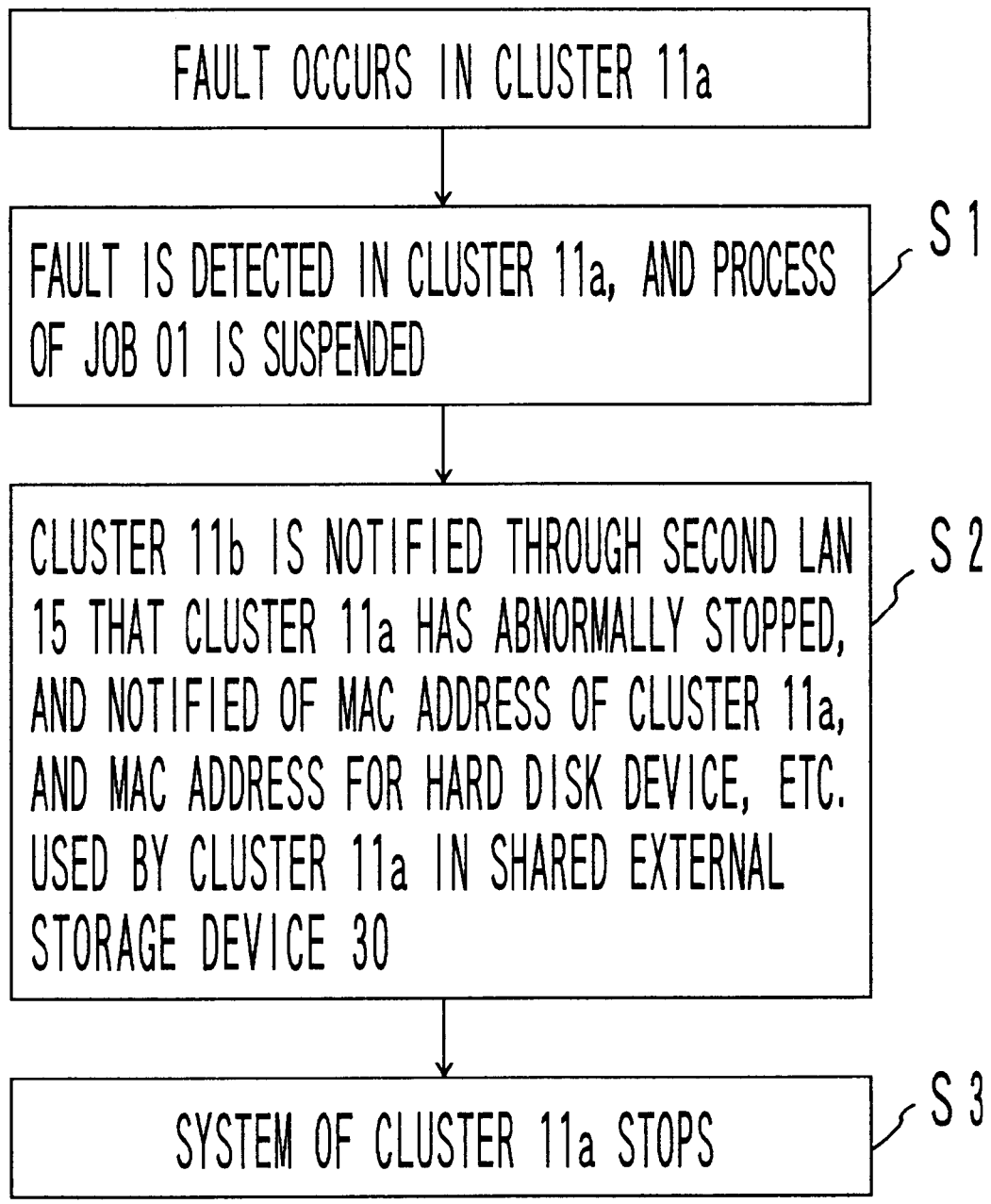
FIG. 6 is a flowchart showing the process of inheriting JOB 01 performed by the LAN control device 17a belonging to the faulty cluster 11a when there is a faulty cluster in the clusters shown in FIG. 5.

Described below by referring to FIG. 6 is the case where the cluster 11*a* becomes faulty as shown in FIG. 5 as described above, and the job being processed, that is, a JOB 01, is inherited by the cluster 11*b*. First, the cluster 11*a* performs the processes in steps S1 through S3. The processes are performed by a LAN control device 17*a* belonging to the cluster 11*a*.

First, it is detected that the cluster 11*a* becomes faulty. When the process of the JOB 01 being performed by the cluster 11*a* is suspended when the cluster becomes faulty, the JOB 01 writes the status of the suspended process to the shared external storage device 30 (S1).

Then, the cluster 11*a* notifies the cluster 11*b* through the second LAN 15 of the abnormal termination of the process being performed by the cluster 11*a* and the JOB 01 to be inherited. Simultaneously, the cluster 11*a* notifies the cluster 11*b* of its own MAC address 01, and the MAC address, for example, 10, for the hard disk device or a partition, etc. being used by the cluster 11*a* in the shared external storage device 30 (S2).

After the notification in S2, the system of the cluster 11*a* is stopped (S3).

Corresponding to the process performed by the LAN control device 17*a* belonging to the above described cluster 11*a*, the process to be performed by a LAN control device 17*b* belonging to the cluster 11*b* to inherit the JOB 01 performed by the faulty cluster 11*a* is described below by referring to FIG. 7.

First, the cluster 11*b* receives from the LAN control device 17*a* belonging to the cluster 11*a* a request to inherit the process of the JOB 01, the MAC address 01 for the cluster 11*a*, and the MAC address, for example, 10, for the hard disk device or the partition, etc. being used by the cluster 11*a* in the shared external storage device 30 (S11).

Then, the MAC address 01 for the cluster 11*a* received in S11 is added to the MAC address for the cluster 11*b* stored in the LAN control device 17*b*. Simultaneously, the MAC address 10 for the hard disk device or partition, etc. used by the cluster 11*a* in the shared external storage device 30 is stored (S12).

Next, according to the received MAC address, the JOB 01 being performed by the faulty cluster 11*a* is activated (S13).

The status of the process of the JOB 01 being performed by the faulty cluster 11*a* is read from the shared external storage device 30, and the process of the JOB 01 is inherited according to the value of the last status (S14).

Described above is the process performed by each cluster when a job being performed by any faulty cluster is inherited by another cluster. In this case, the shared external storage device 30 does not perform its own process relating to the inheritance of the job.

Figure 8:
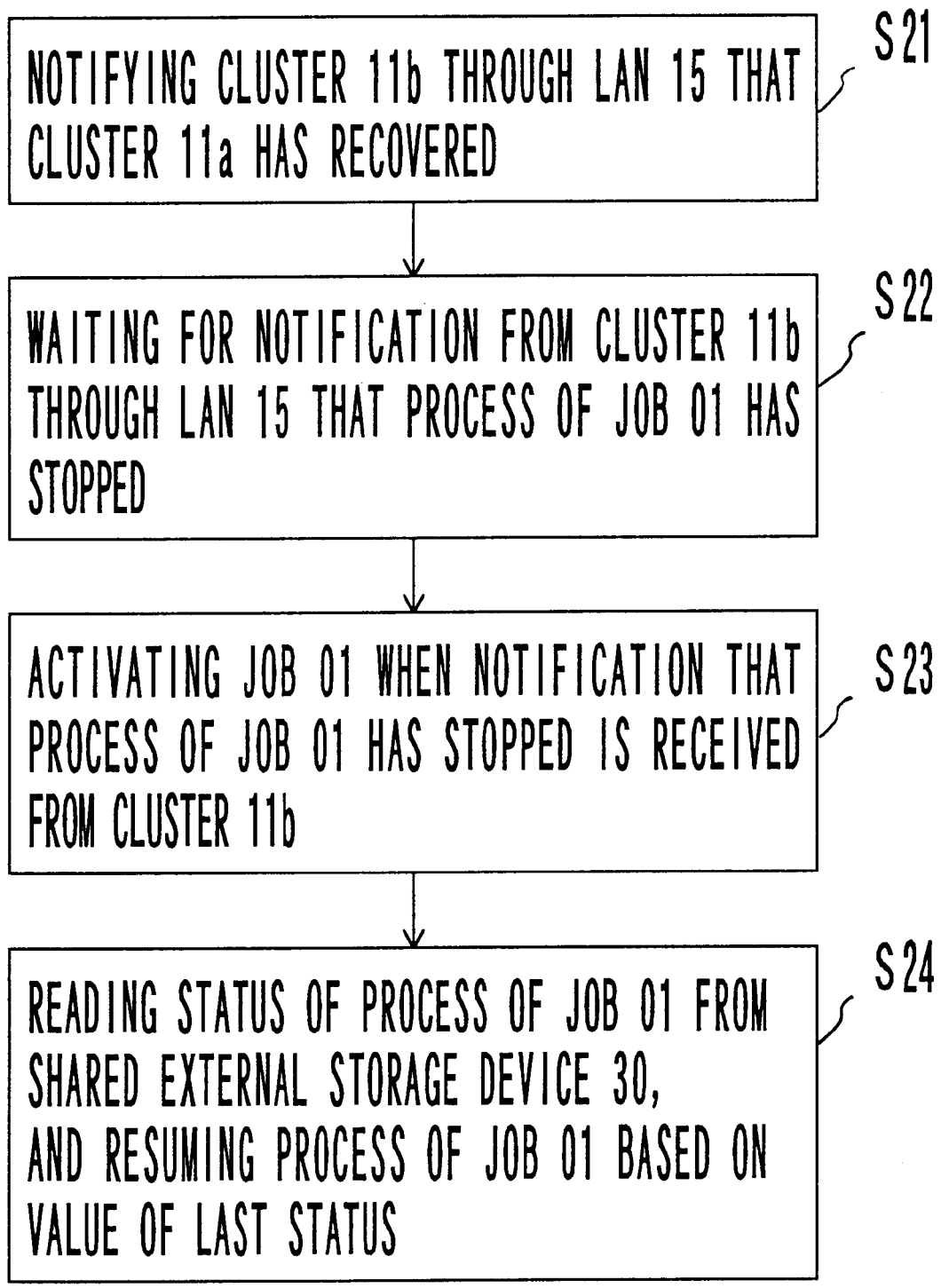
FIG. 8 is a flowchart showing the process performed by the LAN control device 17a belonging to the cluster 11a when the cluster 11a recovers from the faulty state after having stopped its operation when there is a faulty cluster in the clusters shown in FIG. 5.

Described below is the process when a cluster recovers from an erroneous condition. The cluster 11*a* as shown in FIG. 5 which has stopped its operation due to the above described fault recovers as follows. Described first by referring to FIG. 8 is the process to be performed by the LAN control device 17*a* belonging to the cluster 11*a*.

First, the cluster 11*b* is notified through the second LAN 15 that the cluster 11*a* has recovered (S21).

Then, the activation of the JOB 01 is waited for until the notification is received from the cluster 11*b* through the LAN 15 that the process of the JOB 01 inherited by the cluster 11*b* after the cluster 11*a* processing the JOB 01 became faulty has been stopped (S22).

After the notification that the process of the JOB 01 has been stopped is received, the JOB 01 is activated (S23).

The status of the process of the activated JOB 01 is read from the shared external storage device 30, and the process of the JOB 01 is resumed according to the value of the last status (S24).

Figure 9:
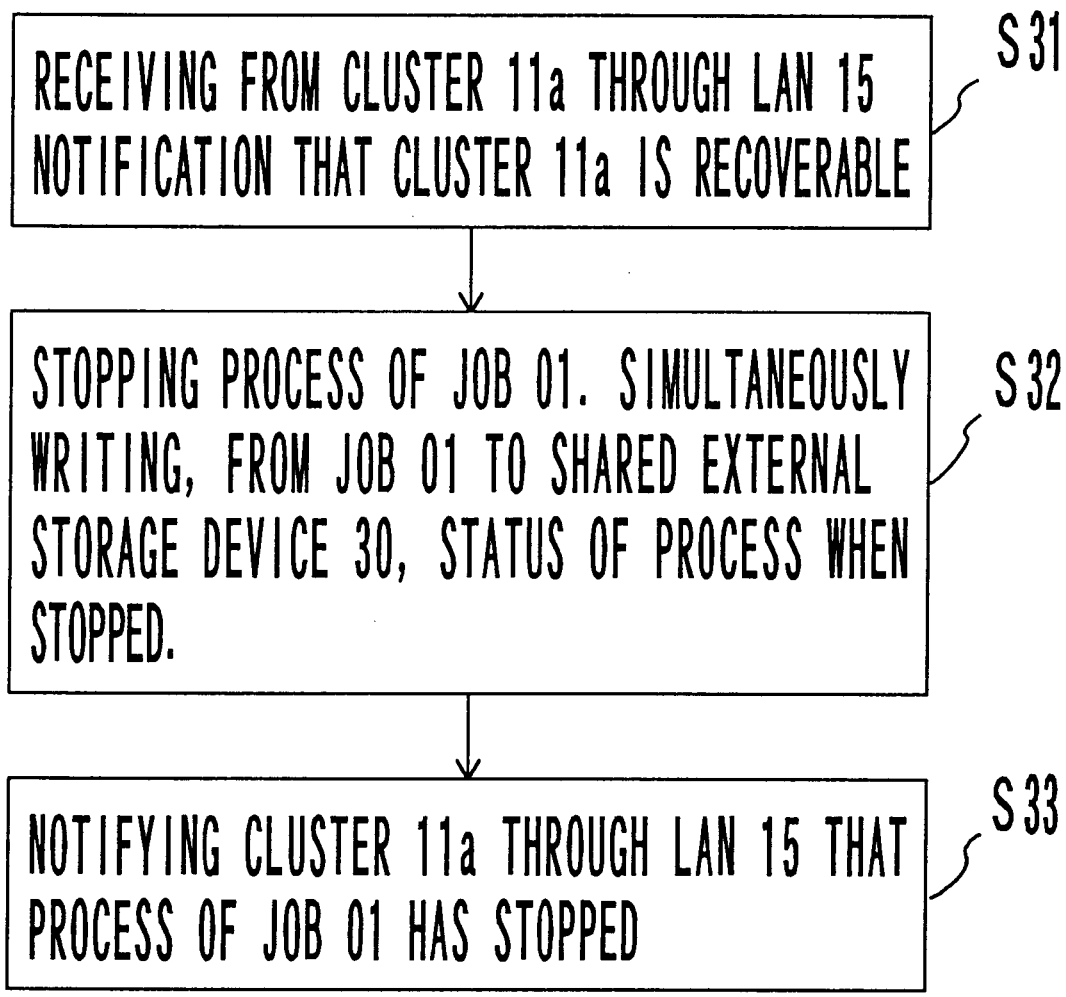
FIG. 9 a flowchart showing the process performed by the LAN control device 17b belonging to the cluster 11b, which has inherited JOB 01 of the cluster 11a, when the cluster 11a recovers from the faulty state after having stopped its operation when there is a faulty cluster in the clusters shown in FIG. 5.
Figure 10:
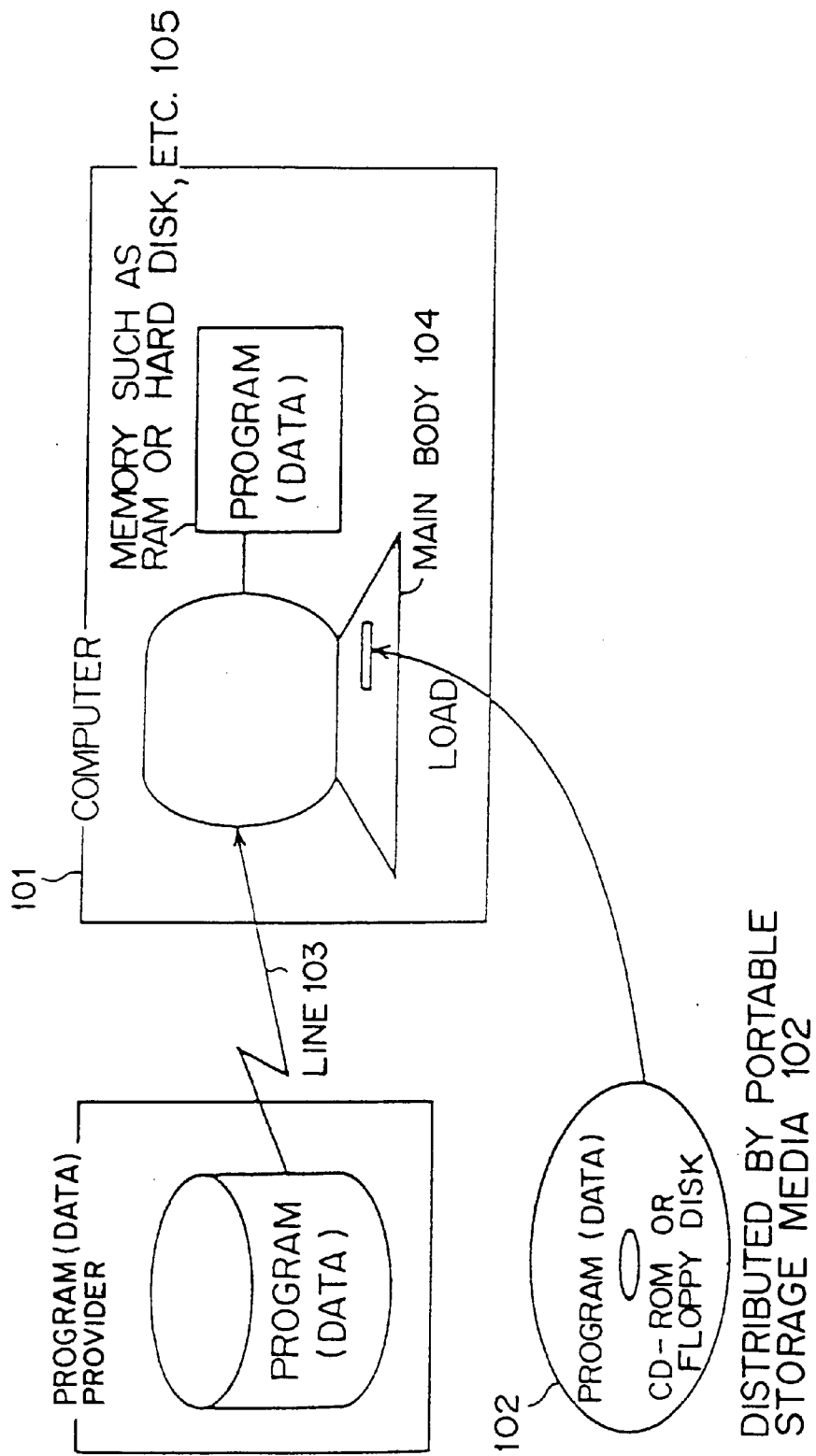
FIG. 10 is a block diagram showing the configuration of a computer which implements the embodiment of the present invention.

Described below by referring to FIG. 9 is the processes performed by the LAN control device 17*b* belonging to the cluster 11*b* corresponding to the process performed by the LAN control device 17*a* belonging to the cluster 11*a* when the cluster 11*a* recovers as described above.

First, a notification that the cluster 11*a* has recovered is received from the cluster 11*a* through the second LAN 15 (S31).

Then, the process of the JOB 01 performed by the cluster 11*a* before the cluster 11*a* became faulty and inherited by the cluster 11*b* is stopped. At this time, the JOB 01 writes to the shared external storage device 30 the status of the process when it is stopped (S32).

The cluster 11*a* is notified through the LAN 15 that the process of the JOB 01 has been stopped (S33).

As in the case where a job is inherited when a cluster becomes faulty, the shared external storage device 30 does not perform any process relating to the recovery.

For example, when only the cluster 11*a* accesses a shared external storage device and another cluster requests the cluster 11*a* to access a disk in the system shown in FIG. 2, a job can be inherited, when the cluster becomes faulty, by performing the processes similar to the above described processes. For example, when the cluster 11*b* cannot continue a process when it becomes faulty, for example, the cluster 11*c* inherits necessary information such as the MAC address, etc. through the second LAN 15, and the job which has been performed by the cluster 11*b* is inherited by the cluster 11*c*, thereby continuously performing the process in the multi-cluster system.

The computer, etc. according to the present invention can also perform its function through firmware and software.

FIG. 1 shows an example of a configuration of the computer 101 for realizing an embodiment of the present invention. The computer 101 comprises a mainframe 104 and memory 105 such as RAM, a hard disk, etc. The program data written by the software program code for realizing the above described embodiment of the present invention is, for example, downloaded from a program provider to the memory 105 through the line 103. The computer 101 executes a program loaded to the memory 105.

Instead of downloading through the line 103 as described above, the program data can also be stored in the portable storage medium 102 such as CD-ROM, a floppy disk, etc. The program data can be loaded onto the memory 105 by mounting the portable storage medium 102 in the mainframe 104 and reading the stored data from the portable storage medium 102.

In this case, the program data itself realizes a new function of an embodiment of the present invention, and the memory 105 such as RAM, a hard disk, etc. and the portable storage medium 102 such as CD-ROM, a floppy disk, etc. form part of the embodiment of the present invention.

As described above in detail, when an external storage device is commonly used in the multi-cluster system according to the present invention, for example, a hard disk device or a partition, etc. in the external storage device used by each cluster is made to correspond to an identification symbol, for example, a MAC address. Each cluster is also made to correspond to a MAC address. Thus, a disk can be easily accessed, and a process required to inherit a process being performed by a faulty cluster can also be simplified, thereby improving the effectiveness of the multi-cluster system using a shared external storage device.

In the detailed explanation of the present invention, a cluster is described as being connected through a LAN. However, a network which connects a cluster is not limited to a LAN. The present invention can be applied to a case where a computer is connected through other networks such as a WAN (wide area network), etc. Furthermore, it is obvious that the present invention can be applied not only in a multi-cluster system but also in the Internet.

What is claimed is:

1. An apparatus used in a system having a plurality of apparatus coupled to a storage device, comprising:
    a storage area request unit to notify the storage device of a request amount of a storage area in the storage device and identification information of the apparatus to have the storage area assigned; and
    a storage device access unit to set the identification information of the apparatus as a source address and area identification information of the assigned storage area as a destination address in a frame, send the frame to the storage device and access the storage device using the frame.

2. A storage device used in a system having a plurality of apparatus coupled to said storage device, comprising;
    an area identification information determination unit to determine area identification information for an area to be assigned to each apparatus;
    a storage area assignment unit to notify said apparatus of the area identification information according to a notification of the request amount of the storage area and an identification information of the apparatus from said apparatus; and
    a control unit to control an access to said storage device, wherein
    said apparatus sets the identification information of the apparatus as a source address and the area identification information area as a destination address in a frame and sends the frame to the storage device,
    the control unit detects the addresses in the frame and controls the access to said storage device based on the addresses.

3. The storage device according to claim 2, wherein
    said storage device comprises a plurality of storage units; and
    said area specified by the area identification information is a storage area of one of the plurality of storage units.

4. The storage device according to claim 2, wherein
    said storage device comprises a plurality of storage units; and
    said area specified by the area identification information is a storage area of one of the plurality of storage units, or an area obtained by dividing the storage area of one of the storage units into a plurality of areas.

5. The apparatus according to claim 1, wherein
    said storage device access unit accesses, using an identification information of an another optional apparatus in which becomes inoperable, an area assigned to the optional apparatus in order to inherit a process being performed by the optional apparatus when the optional apparatus becomes inoperable.

6. The storage device according to claim 2, wherein
    said storage device is a duplex device having a primary system and a secondary system; and
    said secondary system comprises operation control unit to perform a writing operation to an external storage device in the secondary system the same as in the primary system in response to write access by said storage device access unit, issuing a switch instruction to the storage device in the primary system when communications are not made for a predetermined time between the storage device in the primary system and the apparatus, and control in such a way that the secondary system can hereafter function as a storage device of the primary system.

7. A system having a plurality of apparatuses connected to a storage device, said system comprising:
    a first apparatus comprising a storage device access request unit to set identification information of the first apparatus as a source address and area identification information of a storage area in the storage device as a destination address in a frame and send the frame to a second apparatus to request a storage device access unit to access the storage area;
    the second apparatus comprising said storage device access unit to send the frame to the storage device and access the storage device based on the frame; and
    the storage device comprising the control unit to detect the addresses in the frame and control access to said storage device based on the addresses.

8. The system according to claim 7, further comprising in said storage device:
    storage area assignment unit to notify said storage device access unit of the area identification information for the area to be assigned to the apparatus according to a notification of the request amount of the storage area of each apparatus and the Identification information of the apparatus from said storage device access unit, wherein
    said storage device access unit accesses the area specified by the notified area identification information.

9. The system according to claim 7, wherein
    said storage device comprises a plurality of storage units; and
    said area specified by the area identification information is a storage area of one of the plurality of storage units.

10. The system according to claim 7, wherein
    said storage device comprises a plurality of storage units; and
    said area specified by the area identification information is a storage area of one of the plurality of storage units, or an area obtained by dividing the storage area of one of the storage units into a plurality of areas.

11. The system according to claim 7, wherein when an optional apparatus of the plurality of apparatus becomes inoperable, said storage device access request unit of another apparatus which inherits a process being performed by the optional apparatus requests said storage area access unit to access an area assigned to the optional apparatus using an identification information of the optional apparatus in the plurality of apparatus which becomes inoperable, thereby performing access through said storage area access unit; or said storage device access unit of the apparatus which inherits the process being performed by said optional apparatus of at least one of the apparatus accesses the area assigned to the optional apparatus using the identification information of the optional apparatus.

12. The system according to claim 7, further comprising in said storage device:

data transfer control unit for transmitting data in said storage device accessed by said storage device access unit directly to at least one apparatus comprising said storage device access unit or an apparatus comprising said storage device access request unit according to an identification information of each apparatus.

13. The apparatus according to claim 1, wherein the system is a multi-cluster system.

14. A method of controlling a system having a plurality of apparatus connected to a storage device, comprising:

receiving notification from each apparatus of a request amount of a storage area in the storage device and identification information of the apparatus;

notifying the apparatus of area identification information for an area assigned to the apparatus after assigning the storage area to the apparatus according to the identification information of the apparatus and the request amount of the storage area;

receiving a frame from the apparatus, in which the identification information of the apparatus is set as a source address and the area identification information of the assigned storage area is set as a destination address; and detecting the addresses in the frame and controlling access from the apparatus to the storage device based on a comparison between the detected address and notified identification information.

15. The method of controlling according to claim 15 further comprising:

when an optional apparatus becomes inoperable in the plurality of apparatus, receiving a notification from the apparatus of an existence of a process to be inherited, an identification information of the apparatus, and an area identification information for an area assigned in the storage device; and inheriting the process according to an identification information of the inoperable apparatus and a notified area identification information.

16. A storage medium, which stores a program for directing a computer to perform a process so as to control a system having a plurality of apparatus connected to a storage device, the process comprising:

receiving notification from an apparatus of a request amount of a storage area in the storage device and identification information of the apparatus;

notifying the apparatus of area identification information for an area assigned to the apparatus after assigning the storage area to the apparatus according to the identification information of the apparatus and the request amount of the storage area;

receiving a frame from the apparatus, in which the identification information of the apparatus is set as a source address and the area identification information of the assigned storage area is set as a destination address; and detecting the addresses in the frame and controlling access from the apparatus to the storage device based on a comparison between the detected address and notified identification information.

17. A storage medium according to claim 16, the process further comprising:

when an optional apparatus becomes inoperable in the plurality of apparatus, receiving a notification from the inoperable apparatus of an existence of a process to be inherited, an identification information of the inoperable apparatus, and an area identification information for an area assigned in the storage device; and inheriting the process according to an identification information of the inoperable apparatus and a notified area identification information.

18. An apparatus, comprising:

a storage device connected to a plurality of processing units, each of the processing units having respective identification information and assigned storage area information; and a communication device facilitating communication between the processing units and the storage device, the communication device receiving a frame from a processing unit comprising identification information and storage area information, and accessing the storage device based on the frame and communicating a result of the access to the processing unit.

19. A method, comprising:

assigning identification information and assigned storage area information in a storage device to a plurality of processing units; and receiving a frame from a processing unit comprising identification information and storage area information, and accessing the storage device based on the frame and communicating a result of the access to the processing unit.

20. A computer readable storage, controlling a computer by:

assigning identification information and assigned storage area information in a storage device to a plurality of processing units; and receiving a frame from a processing unit comprising identification information and storage area information, and accessing the storage device based on the frame and communicating a result of the access to the processing unit.

* * * * *

UNITED STATES PATENT AND TRADEMARK OFFICE
CERTIFICATE OF CORRECTION

PATENT NO. : 6,356,985 B1
DATED : March 12, 2002
INVENTOR(S) : Masahiro Ichimi et al.

It is certified that error appears in the above-identified patent and that said Letters Patent is hereby corrected as shown below:

Column 10,
Line 53, delete "Identification" and insert -- identification --;

Column 11,
Line 48, delete "15" and insert -- 14 --.

Signed and Sealed this

Fourth Day of June, 2002

*Attest:*

*Attesting Officer*

JAMES E. ROGAN
*Director of the United States Patent and Trademark Office*